United States Patent [19]
Schlienz et al.

[11] Patent Number: 5,524,480
[45] Date of Patent: Jun. 11, 1996

[54] METHOD OF DETERMINING THE ROUGH ENGINE RUN OF AN INTERNAL COMBUSTION ENGINE

[75] Inventors: Ulrich Schlienz, Bühl-Neusatz; Raymond Sieg, Stuttgart; Alexander Schwarz, Ettlingen, all of Germany

[73] Assignee: Robert Bosch GmbH, Stuttgart, Germany

[21] Appl. No.: 838,752

[22] PCT Filed: Sep. 18, 1990

[86] PCT No.: PCT/DE90/00714

§ 371 Date: Mar. 17, 1992

§ 102(e) Date: Mar. 17, 1992

[87] PCT Pub. No.: WO91/05233

PCT Pub. Date: Apr. 18, 1991

[30] Foreign Application Priority Data

Sep. 29, 1989 [DE] Germany ............... 39 32 649.7

[51] Int. Cl.⁶ ................................................ G01M 15/00
[52] U.S. Cl. ................................................................. 73/116
[58] Field of Search .................................. 73/116, 117.3, 73/35; 60/277; 123/419; 364/431.08

[56] References Cited

U.S. PATENT DOCUMENTS

| | | |
|---|---|---|
| 3,815,411 | 6/1974 | Emerson . |
| 3,924,457 | 12/1975 | Oshima et al. ............ 60/277 |
| 4,123,935 | 11/1978 | Maringer . |
| 4,126,037 | 11/1978 | Hanson et al. ............ 73/116 |
| 4,383,440 | 5/1983 | Murata . |
| 4,812,979 | 3/1989 | Hermann et al. . |
| 4,877,273 | 10/1989 | Wazaki et al. . |
| 4,924,830 | 5/1990 | Abe ............................ 73/117.3 |
| 5,087,881 | 2/1992 | Peacock ..................... 73/117.3 |

FOREIGN PATENT DOCUMENTS

| | | |
|---|---|---|
| 0275862 | 7/1988 | European Pat. Off. . |
| 2245781 | 3/1973 | Germany . |
| 2509199 | 10/1975 | Germany ............ 73/117.2 |
| 2912773 | 10/1980 | Germany . |
| 3104698 | 5/1982 | Germany . |
| 3105331 | 9/1982 | Germany . |
| 3505440 | 8/1986 | Germany . |
| 3830603 | 3/1989 | Germany . |
| 2222887 | 3/1990 | United Kingdom ......... 73/117.3 |
| 9003508 | 4/1990 | WIPO ............................ 73/116 |

OTHER PUBLICATIONS

Robert Bosch GmbH "Technische Unterrichtung, Generatoren", May 1974, Germany.

*Primary Examiner*—Robert Raevis
*Attorney, Agent, or Firm*—Spencer & Frank

[57] ABSTRACT

A method is proposed for determining the rough engine run of an internal combustion engine (10), wherein a signal processing arrangement (13–19, 30, 50, 51) determines the engine rotation from a signal (Ub) appearing at a generator (11) driven by the internal combustion engine (10) or at a load (12) connected to the generator (11). The signal (Ub) is composed of signal components including long period durations (Tm) and signal components including short period durations (Tmn) which are evaluated separately as well as together in an evaluation unit (15). The signal component including the short period durations (Tmn) can be derived from commutation oscillations (40) which occur within signal Ub if the generator (11) is configured as an alternating current/three-phase current generator and is equipped with rectifiers and phase fan-in.

12 Claims, 2 Drawing Sheets

METHOD OF DETERMINING THE ROUGH ENGINE RUN OF AN INTERNAL COMBUSTION ENGINE

STATE OF THE ART

The invention relates to a method of determining the rough engine run of an internal combustion engine. This is a measure for the irregularities in the angular velocity of the crankshaft caused by fluctuations in energy conversion (from cycle to cycle and between the cylinders of the internal combustion engine). On the one hand, rough engine run is caused by the fact that comparatively great variations may occur during the energy conversion. The variations are based on fluctuations of particle movements, the air ratio, the residual gas percentage, the temperature and the processes during start-up of the combustion process. Spark ignited as well as Diesel internal combustion engines are affected in the same way. In addition to these statistical processes there are systematic deviations or errors which result in an increase in rough engine run. This includes compression, possibly electrical ignition, valve play and measured additions of fuel which may be different for each cylinder of the internal combustion engine and thus influence rough engine run.

German Patent 3,505,440 discloses a method for analyzing the operational state of internal combustion engines equipped with electrical ignition systems wherein the number of revolutions of the internal combustion engine is determined with high time resolution—and thus the rough engine run—by an electronic measurement of the time interval between two successive ignition voltage pulses of different cylinders. Additionally, the ignition pulses of a reference cylinder are detected so as to permit an association of the rough engine run with the individual cylinders of the internal combustion engine.

It is the object of the invention to provide a method for determining the rough engine run of an internal combustion engine without the requirement of a special sensor and suitable for spark ignited as well as Diesel internal combustion engines.

SUMMARY OF THE INVENTION

The above object generally is accomplished according to the invention by a method of determining the rough running of an internal combustion engine, wherein a signal processing arrangement determines the engine rotation of the internal combustion engine from a signal present at an output of a generator driven by the internal combustion engine or at a load connected to the generator.

The method according to the invention has the initial advantage of easy adaptation. It merely requires a connection to the generator or to a load connected to the generator. Insofar as the internal combustion engine is intended as a vehicle engine, it becomes possible to make a connection, for example, at the cigarette lighter. Since no special sensors are required, the method according to the invention is suitable equally well for determining the rough engine run of spark ignited as well as Diesel internal combustion engines.

Another advantage of the method according to the invention is that the determination of rough engine run is possible with different types of existing generators. Direct current, alternating current and three-phase current generators are suitable, with as well as without rectifiers.

Advantageous features and improvements of the method according to the invention are likewise disclosed.

According to a first embodiment, the rough engine run is determined from a component of a signal Ub which has a long period duration Tm. Times Tm correspond to the interval between every two combustion processes in the internal-combustion engine.

According to a further and preferred embodiment, it is provided that the rough engine run is determined from a component of signal Ub which includes a short period duration Tmn.

This feature has the advantage that the measured values are high in resolution since the generator driven by the internal combustion engine generally rotates at a higher number of revolutions than the internal combustion engine itself. The higher number of revolutions of the generator compared to that of the internal combustion engine and the signal curve Ub which is dependent upon the basic configuration of the generator results in numerous time periods Tmn between the respective combustion processes of the cylinders so that the evaluation of times Tmn permits the attainment of a particularly high resolution of the measured value without interpolation.

A modification of this feature provides for the determination of times Tmn from commutation oscillations of signal Ub. Commutation oscillations occur if an alternating current/three-phase current generator equipped with rectifiers is involved.

In an advantageous modification of the method according to the invention an evaluation unit, in which the rough engine run is determined, is fed a signal from a reference cylinder so as to make possible an association of the rough engine run with the individual cylinders of the internal combustion engine.

Another advantageous modification of the method according to the invention relates to the evaluation of the measured signals for a determination of the rough engine run as a function of signals fed by a controller/regulator of the internal combustion engine to the rough engine run evaluation unit. Thus, the measurement pickup, which is possible in any case, can be correlated with given desired or actual values from the controller/regulator at a constant number of revolutions, for example while idling, as well as under varying numbers of revolution, for example during accelerations or decelerations of the internal combustion engine.

An advantageous feature of the method according to the invention provides for the use of adaptive filters for a determination of times Tm and/or times Tmn, since the signal Ub which is obtained, for example, from the on-board network, is advisably freed of interferences caused by electromagnetic couplings or, for example, by the generator controller. The adaptive filter permits good noise suppression over the entire useful bandwidth of the signal spectrum to be expected with a maximum useful signal to noise signal ratio.

DETAILED DESCRIPTION OF THE PREFERRED EMBODIMENTS

Figure 1:
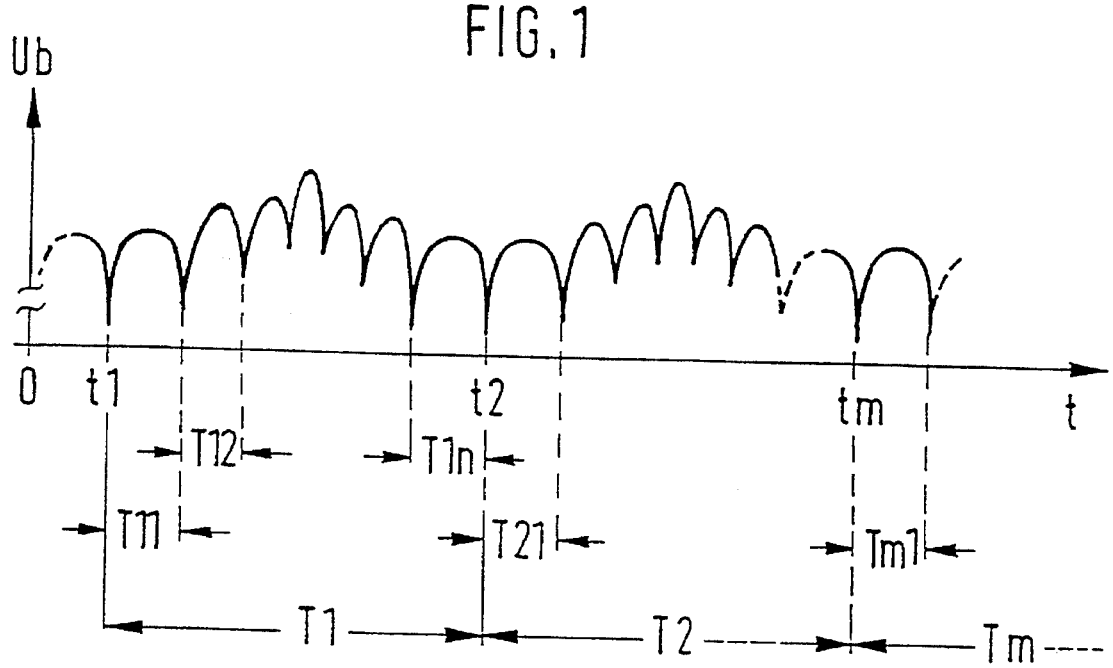
FIG. 1 shows a signal curve from which the rough engine run is determined.

FIG. 1 shows a signal Ub present at a generator driven by an internal combustion engine or at a load that is supplied with electrical energy by the generator. Signal Ub includes a quasi-periodic signal component of short period durations T1, T2, . . . , Tm. Times Tm correspond to the differences between the times t1 and t2 to t(m-1) and tm entered on time axis t. The number m corresponds to the number of cylinders of the internal combustion engine. Times Tm may have different lengths. They correspond to an operating cycle of the internal combustion engine covering one combustion process in one cylinder; in a properly operating internal combustion engine this cycle would lead to a rise in the number of revolutions and a subsequent drop.

Signal Ub further has a signal component of short period durations T11, T12, . . . , T1n, . . . Tm1, Tm2, . . . Tmn. Times Tm1, . . . Tmn together provide the time Tm for the operating cycle of a cylinder. Times Tm1, . . . Tmn are of different lengths within time Tm and with respect to the corresponding times T(m-1)1, . . . , T(m-1)n of the operating cycle of the preceding cylinder.

Figure 2:
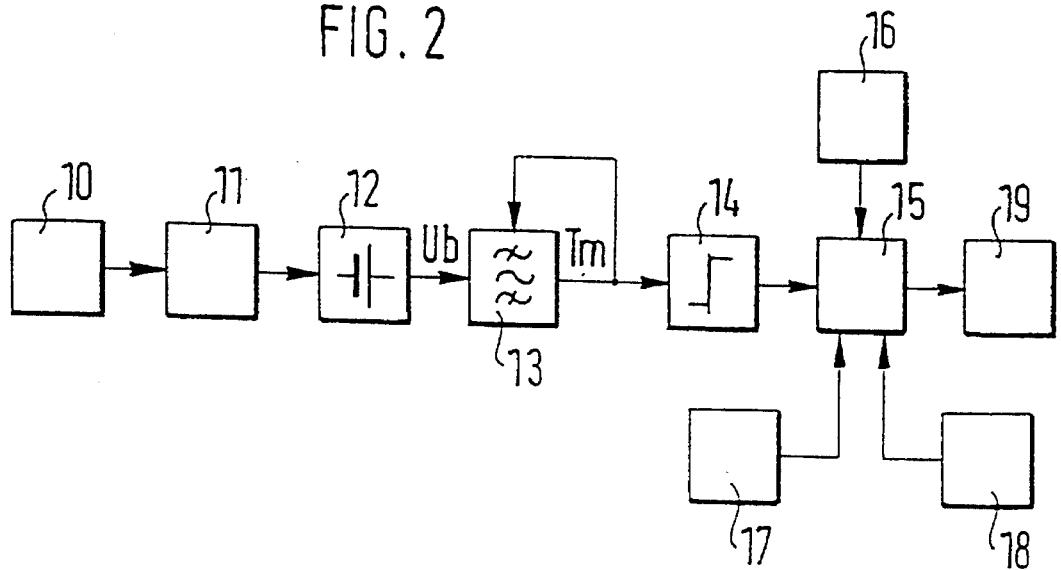
FIG. 2 is a block circuit diagram for a signal processing arrangement for determining the rough engine run of an internal combustion engine.

FIG. 2 is a block circuit diagram for a signal processing arrangement. Reference numeral 10 identifies an internal combustion engine which drives at least one generator 11. Generator 11 puts out electrical energy to a load 12 which, if the internal combustion engine is disposed in a motor vehicle, corresponds, for example, to the on-board network of a motor vehicle. The signal Ub appearing at load 12 is fed to a first signal filter 13 whose output signal is fed to a threshold stage 14 as well as to filter 13 itself. A signal component including times Tm appears at the output of filter 13 from which threshold stage 14 makes available suitable signals, preferably digital signals, for the subsequent evaluation unit 15. Evaluation unit 15 also receives signals from a cylinder number indicator 16, a reference cylinder generator 17 and a controller/regulator 18 of internal combustion engine 10. Evaluation unit 15 puts out a signal for an output 19.

Figure 3:
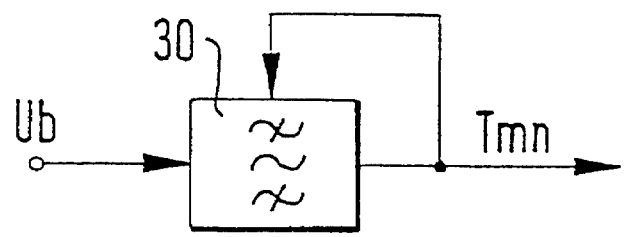
FIG. 3 is a block circuit diagram for an adaptive filter included in FIG. 2.

FIG. 3 is a block circuit diagram of a signal filter 30 which receives signal Ub. The signal component including times Tmn of signal Ub appears at the output of filter 30. A signal path goes from the output of filter 30 back to filter 30 itself.

Figure 4:
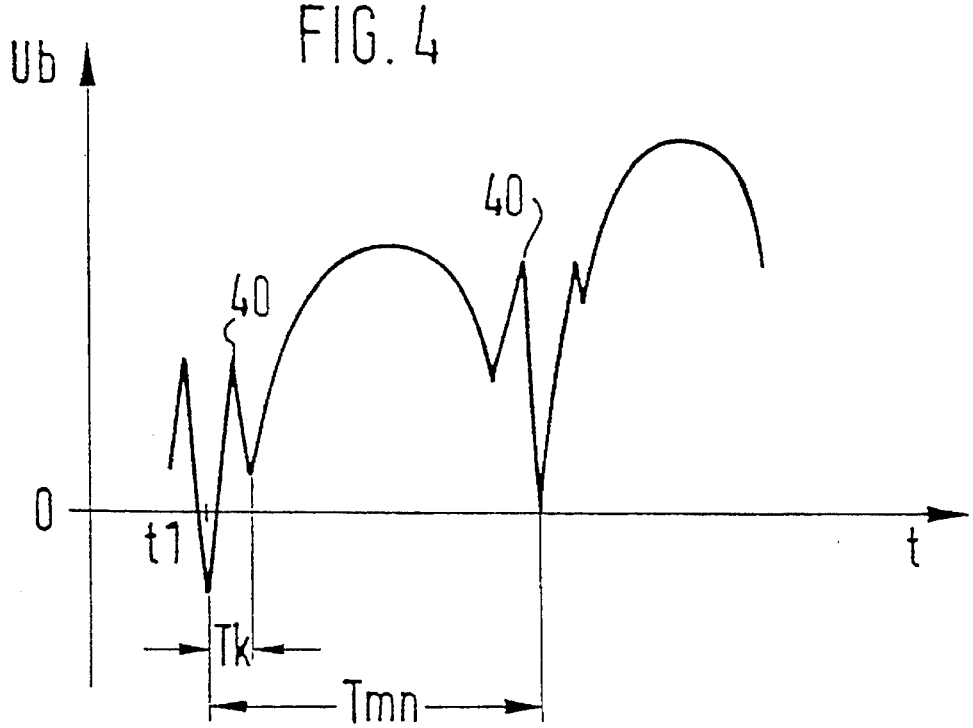
FIG. 4 shows the signal curve of FIG. 1 with a greater time resolution.

FIG. 4 shows a section of greater time resolution of signal Ub shown in FIG. 1. Short-term commutation oscillations 40 of a time period duration Tk exist between times Tmn.

Figure 5:
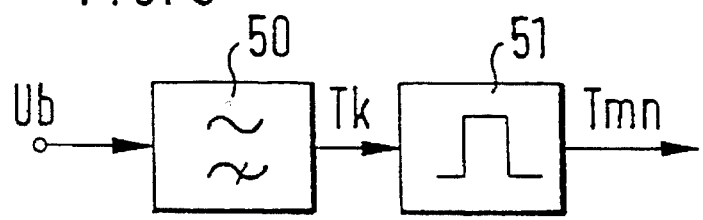
FIG. 5 is a block circuit diagram for a signal processing arrangement for determining a certain signal component from the signal shown in FIG. 4.

FIG. 5 shows a signal processing arrangement for determining times Tmn. Signal Ub is fed via a highpass filter 50 to a signal shaping member 51 at whose output appears a signal including times Tmn.

The method according to the invention for determining the rough engine run of an internal combustion engine will be described in greater detail with reference to the block circuit diagram of FIG. 2 in conjunction with the signal Ub shown in FIG. 1.

Internal combustion engine 10 drives generator 11 which supplies, for example, a load 12 with electrical energy. It is not absolutely necessary for a load 12 to be present since signal Ub appears at generator 11 without load 12 as well as at load 12. Signal Ub is, for example, the voltage across generator 11 or across load 12. However, signal Ub may also be a measure for the current emitted by generator 11 and flowing through load 12.

Different types of generators may be provided as generator 11. Generator 11 may be configured as a direct current generator or as an alternating current generator. The alternating current generator may have one or several phases. The individual phases of the alternating current generator may have rectifiers which are interconnected in such a way that a pulsating direct voltage occurs. This type of generator is called a three-phase current generator and is preferably employed to supply the on-board network of a motor vehicle with electrical energy. The configuration of the generator as an alternating current generator is employed, for example, in heating systems or other electrical loads which do not require direct current. All generator types have in common that the characteristic times Tm and Tmn shown in FIG. 1 occur in signal Ub. Times Tm are determined by the operating cycles and the number of cylinders in the internal combustion engine. In direct current generators, times Tmn depend on the number of separate armature windings and in alternating current generators on the number of phases provided. In all cases, times Tmn are also dependent on the transmission ratio between internal combustion engine and generator. The characteristic signal curve of signal Ub including the parabola-like sections is shown in FIG. 1 as an example for a load 12 that is supplied with direct current and in which only the relatively low alternating voltage component occurs without the considerably higher direct voltage component. However, the characteristic times Tm and Tmn also occur in purely alternating voltage operation in which case positive or negative as well as both halfwaves can be utilized for the evaluation.

The determination of rough engine run can initially be made with times Tm. The signal component including times Tm is separated from signal Ub with the aid of filter 13 which is configured as a bandpass filter. Filter 13 separates undesired low frequency as well as high frequency noise signals as they are caused, for example, by the generator controller or by other switching processes in load 12.

As an advantageous feature, filter 13 is configured as an adaptive filter for which, in particular, a realization as a digital filter or as a filter with switched capacitances is particularly suitable. The digital filter has the advantage of complete software realization. In order to evaluate signal Ub supplied to filter 13, the bandpass filter is tuned over the entire frequency band and, for example, the output amplitude of the filter is evaluated by amplitude measurement. Since noise occurs only sporadically, but the quasi-periodic processes at times Tm of Signal Ub are present continuously, it is possible in this way to correctly set the bandpass parameters of the digital filter or of the switched capacitance filter.

Threshold stage 14, also provided, processes the signal including times Tm in the proper form for further processing in an evaluation unit 15. Evaluation unit 15 determines, for example, a measure for the rough engine run of internal combustion engine 10 from the differences between successive times Tm and T(m+1) or from other arithmetic operations with times Tm and furnishes the result to output 19.

Output 19 may be, for example, a display or a larger diagnostic system. By way of input 16, the desired evaluation method can be put in. Moreover, if output 19 is a display unit, it can be determined by way of input 16 which values are to be displayed and whether, for example, a signal section including previously measured values is to be reviewed. Moreover, it is possible to predetermine by way of input 16 the number of cylinders of the internal combustion engine, which corresponds to the number m. This input value is not absolutely necessary since evaluation unit 15 itself is able to determine the number of cylinders from plausibility checks of times Tm. This possibility exists even if, for example, one cylinder of internal combustion engine 10 is completely out of service so that one signal component of a certain Tm duration is not present, with the preceding time interval T(m−1) being unusually long.

If a reference cylinder signal generator 17 is provided, the rough engine run can be associated with the cylinder numbers of internal combustion engine 10. In a simple configuration, however, this association is not necessary.

A dynamic measurement of rough engine run during accelerations or decelerations of the internal combustion engine provides further information about possible fault sources that increase rough engine run.

Additionally it is possible to feed a signal put out by the controller/regulator 18 of internal combustion engine 10 to the evaluation unit 15 if such signal exists. With this measure it becomes possible to perform a correlation of the determined times Tm and/or Tmn with given desired or actual values from controller/regulator so as to be able to more closely determine a fault or problem coming rough engine running Particularly at high numbers of revolution, a determination of times Tm becomes increasingly more difficult because the fluctuations of times Tm at high numbers of revolution become less and less from cylinder to cylinder. As a further feature of the method according to the invention it is therefore provided to determine the rough engine run directly from times Tmn. An exchange of filter 13 Shown in FIG. 2 by the filter 30 shown in FIG. 3 makes it possible to detect times Tmn. Filter 30 differs from filter 13 only in the determination of a higher cutoff frequency which is adapted to the times Tmn. For example, in evaluation unit 15 successive times Tmn and Tm(n+1) are evaluated. It is also possible to compare the corresponding times from different cylinders, Tmn and T(m+1)n, with one another. Further arithmetic functions are easily possible.

As a further feature of the method according to the invention, the rough engine run is determined with the aid of the most varied arithmetic operations from times Tmn as well as from times Tm. If a signal including times Tmn has already been determined according to the arrangement of FIG. 3, the signal component of times Tm can be obtained by means of frequency modulation (FM)-demodulation from the signal including times Tmn. A second bandpass filter can thus be omitted.

According to a further advantageous feature of the method according to the invention, times Tmn are determined from the commutation oscillations 40 shown in FIG. 4 which exhibit a period duration Tk. Oscillations 40 appear if generator 11 is an alternating current/three-phase current generator with rectification. According to the arrangement of FIG. 5, signal Ub is fed to a filter 50 which, in the simplest case, is configured as a highpass filter whose lower cut-off frequency is tuned to the frequency of the commutation oscillations (40). The output signal of filter 50 leads to a signal shaping member 51 which is configured, for example, as a monostable multivibrator which provides for the possibility of re-triggering so that the oscillation packets each initiate only a single pulse at the output of pulse shaping member 51. In a signal processing block not shown in FIG. 5, the output signal of pulse shaping member 51 may be subjected to a plausibility check which increases noise resistance. Unusable or false pulses which would lead to incorrect times Tmn could be created, for example, as a result of switching processes in the generator regulator or by other electrical loads in the motor vehicle. The further processing of the signal including times Tmn takes place in the arrangement shown in FIG. 2 in the manner already described.

The signal processing arrangements 13 to 19, 30, 50, 51 shown in FIGS. 2, 3 and 5 may be realized completely or in part in the form of software in a computer.

We claim:

1. A method of determining the rough running of an internal combustion engine, wherein a signal processing arrangement determines the engine rotation of the internal combustion engine from a component of a signal present at a generator driven by the internal combustion engine or at a load connected to the generator, with the signal component having a short period duration and being caused by commutation processes in the generator and wherein a further signal processing arrangement is employed which determines the signal component having the short period duration from commutation oscillations of the signal from a generator configured as an alternating current/three-phase current generator equipped with a rectifier.

2. A method according to claim 1, wherein the signal component having the short period duration is filtered out of the signal by means of an adaptive filter.

3. A method according to claim 1, employing a plausibility check of the signal put out by the further signal processing arrangement.

4. A method according to claim 1, employing an association of the engine rotation with the individual cylinders of the internal combustion engine with the aid of a given reference cylinder that is determined by means of a reference cylinder signal generator.

5. A method according to claim 4, wherein the number of cylinders of the internal combustion engine is fed to an evaluation unit of the signal processing arrangement by way of an input.

6. A method according to claim 1, wherein the rough engine run is evaluated as a function of signals fed by a controller/regulator of the internal combustion engine to an evaluation unit of the signal processing arrangement.

7. In a method of determining the rough running of an internal combustion engine, including determining the engine rotation of the internal combustion engine from a component of a signal present at an output of a generator driven by the internal combustion engine or at a load connected to the generator; the improvement wherein the signal component used for said determination is caused by commutative processes in the generator and has a short period duration, the generator is configured as an alternating current/three-phase current generator provided with a rectifier; and said signal component having the short period duration is determined by detecting groups of commutation oscillations of a different period duration in the signal from the generator.

8. A method according to claim 7, including filtering the signal component having the short period duration out of the signal at the output of the generator or at a load connected to the generator by an adaptive filter.

9. A method according to claim 7, wherein said step of detecting includes filtering the signal from the generator by a high pass filter having a lower cut off frequency corresponding to the frequency of said commutation oscillations.

10. A method according to claim 9, wherein said step of detecting further comprises producing pulses at a frequency corresponding to the time duration between successive commutation oscillation groups.

11. A method according to claim 7, further comprising associating the engine rotation with the individual cylinders of the internal combustion engine with the aid of a given reference cylinder determined by a reference cylinder signal generator.

12. A method according to claim 7, wherein said step of determining the engine rotation includes evaluating the rough engine running as a function of a signal produced by a controller/regulator of the internal combustion engine.

* * * * *